Patented Oct. 16, 1951

2,571,333

UNITED STATES PATENT OFFICE 2,571,333

THIOPHENETHIOLS-PHOSPHORUS HALIDE REACTION PRODUCTS

John W. Brooks, Wenonah, N. J., assignor to Socony-Vacuum Oil Company, Incorporated, a corporation of New York No Drawing. Original application December 30, 1947, Serial No. 794,797. Divided and this application January 6, 1949, Serial No. 69,599

7 Claims. (Cl. 260—332.3)

This invention relates to a new group of chemical compounds or compositions of matter formed by the reaction of thiophenethiols with phosphorus halides. It further relates to a method of preparation of the new reaction products.

Prior to this invention, alcohols, phenols, mercaptans, and the like were known to react with phosphorus halides to yield a variety of products, depending upon the conditions employed. For example, when an alcohol is reacted with phosphorus trichloride any one or any combination of the following reactions may occur, depending upon the proportions of reactants and the conditions of reaction:

(1) $3ROH + PCl_3 \rightarrow (RO)_3P + 3HCl$
(2) $2ROH + PCl_3 \rightarrow (RO)_2PCl + 2HCl$
(3) $ROH + PCl_3 \rightarrow ROPCl_2 + HCl$
(4) $3ROH + PCl_3 \rightarrow 3RCl + P(OH)_3$
(5) $2ROH + PCl_3 + H_2O \rightarrow (RO)_2POH + 3HCl$ Other phosphorus halides such as $POCl_3$, $PSCl_3$, $PCl_5$, etc., undergo similar reactions. By proper control of reaction conditions any one of the numerous possible products may be formed in preference to the others. For example, the following reactions may be so conducted as to produce the indicated products in good yields, and substantially to the exclusion of other undesired products.

$3ROH + PCl_3 \rightarrow PO(OR)_3 + 3HCl$
$3ROH + POCl_3 \rightarrow PO(OR)_3 + 3HCl$
$3ROH + PSCl_3 \rightarrow PS(OR)_3 + 3HCl$ The presence of pyridine increases the speed of reaction and helps to drive it to completion by removing the hydrochloric acid (in the form of pyridine hydrochloride) as it is formed. It also decreases the amount of side reactions, such as the formation of alkyl chlorides and the like.

According to the present invention it has been discovered that thiophenethiol, and particularly 3-thiophenethiol, may be subjected to reactions of the type indicated hereinbefore with a resultant production of a whole new series of chemical compounds or compositions of matter. These new chemical compounds or new compositions of matter are particularly useful as addition agents for lubricating compositions, which they stabilize very effectively. They are also useful as intermediates in the preparation of other sulfur and phosphorus containing organic compounds and as synthetic lubricants, wetting agents, emulsifiers and the like.

REACTANTS

The preferred thiophenethiol for use in accordance with this invention is 3-thiophenethiol. 2-thiophenethiol may be utilized, as may also thiophenes containing a plurality, that is, 2, 3, or 4 thiol radicals attached to the thiophene nucleus. However, when more than one thiol radical is attached to the thiophene nucleus there is a tendency to form high molecular weight copolymers with the phosphorus halides and hence the resultant compositions are of a somewhat different nature, and usable for somewhat different purposes than are the compounds formed by the use of thiophene containing but a single thiol radical attached to the nucleus.

The preferred phosphorus halides for use according to this invention are the phosphorus chlorides, the phosphorus oxychlorides and the phosphorus thiochlorides. The corresponding phosphorus bromides, iodides and fluorides may be used, as may also the corresponding phosphorus oxy or thio-bromides, iodides or fluorides.

In the case of either of the two reactants they may be used in either the chemically pure state, in the commercial state, or in admixture with other noninterfering compounds. Obviously, also, mixtures of thiophenethiols or mixtures of phosphorus halides may be used. Instead of phosphorus oxy- or thio-halides, phosphorus selenium or phosphorus tellurium halides may be used.

REACTION CONDITIONS

In general it is preferred to react one molecular proportion of the phosphorus halide with either one, two or three molecular proportions of the thiophenethiol. This tends to favor the production of either the mono-, di-, or tri-thiophene thio-ester of the corresponding phosphorus acid. The mono- and di-esters are customarily referred to as acid esters whereas the tri-ester is usually considered to be the neutral ester.

The reaction is conveniently accomplished in a solvent such as toluene, xylene or benzene. Numerous other organic solvents can be used as will be apparent to those skilled in the art. Preferably a quantity of pyridine is added to the reaction mixture to absorb the hydrochloric acid produced by the reaction. Other compounds that will perform this function will also be apparent to those familiar with the art.

The reaction is exothermic so that it is usually necessary to cool the reactants prior to mixing and apply cooling during the initial stages of the reaction. It has been found preferable to maintain the temperature of the reactants and the reaction mixture at a temperature of less than 15° C. during the initial stages of the reaction, and to raise the temperature as necessary during the later stages of the reaction to cause the reaction to go to completion. In some cases the temperature is raised to as much as 150° C. to cause the reaction to go to completion while in other cases it is not necessary to raise the reaction temperature above room temperature.

The products of the reaction may be purified by filtration to remove the pyridine hydrochloride, distillation to remove by-products and unreacted materials, and drying to remove water.

Typical reactions in accordance with the principles of this invention are as follows:

EXAMPLES (1)
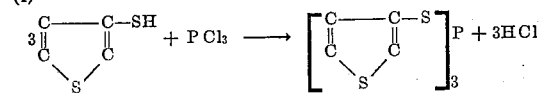

(2)
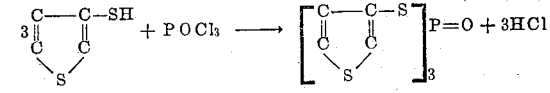

(3)
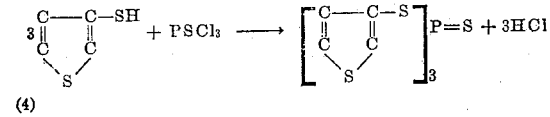

(4)
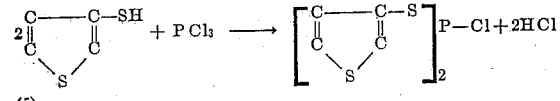

(5)
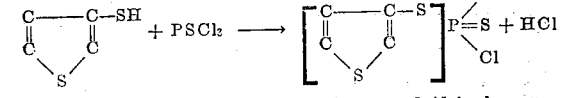

Further details and advantages of this invention will be apparent from the following specific examples of reactions conducted in accordance with the principles thereof:

*Example I.—Preparation of tri-3-thienyl trithiophosphite*

Two hundred and forty-three grams (2.1 mols) of 3-thiophenethiol, 200 ml. of toluene, and 166 grams (2.1 mols) of pyridine were placed in a flask. To this mixture, cooled to 10° C., 96.6 grams (0.7 mol) of $PCl_3$ were added very slowly, keeping the temperature between 9–12° C. This addition required two hours. After stirring for 30 minutes, the temperature was slowly raised over a period of four hours to 120° C. An additional 200 cc. of toluene were added during the heating process because the mixture became too viscous. The reaction product was filtered, the filtrate washed with cold water and dried over $MgSO_4$. After most of the toluene was topped off, the solution was cooled in ice water and the product separated out as white crystals. This solid was recrystallized from toluene solution and a 51% yield of product was obtained. M. P.=71.5–73° C.

| Analyses of Product | | Theoretical |
|---|---|---|
| | *Per cent* | *Per cent* |
| Sulfur | 49.6% | 51.1 |
| Phosphorus | 7.9% | 8.25 |

*Example II.—Preparation of tri-3-thienyl trithiophosphate*

To a 3-liter flask were added 199 grams (1.3 mols) of $POCl_3$, 500 cc. of benzene and 340 grams (4.3 mols) of pyridine. The mixture was cooled to 2° C. and 452 grams (3.9 mols) of 3-thiophenethiol were added dropwise. After addition was completed the ice bath was removed and the stirrer left running for 2 hours. The reaction mixture was filtered to remove the pyridine hydrochloride. The filtrate was topped to 163° C. under 4 mm. and the product was obtained as a residue in 51% yield.

*Example III.—Preparation of tri-3-thienyl tetrathiophosphate*

Four hundred thirty-five grams (3.75 mols) of thiophenethiol were added slowly to a two-liter flask containing 212 grams (1.25 mols) of $PSCl_3$, 316 grams (4 mols) of pyridine, and 500 cc. of benzene. The temperature was kept at 2–5° C. during the addition. Stirring was continued for five hours after the addition was complete. The reaction product was filtered to remove the pyridine hydrochloride and the filtrate washed with cold water, and then dried over $MgSO_4$. Petroleum ether was then added to the dried product and crystals of tri-3-thienyl tetrathiophosphate formed on cooling. Yield=60.8%.

In order to determine the efficacy of the new compounds in inhibiting the deterioration of mineral lubricating oil, the products of the three examples were blended with oil and the blends subjected to a modified German tar test to determine the antioxidant activity thereof. Such a test involves heating a 150-gram sample of the oil to be tested at a temperature of 120° C. while bubbling oxygen gas through the oil for a period of 70 hours. The acidic oxidation products formed are then determined by titrating with alcoholic potash. Results for a blank oil (uninhibited) and for oils blended with the products of the above examples, are given in Table I in terms of neutralization numbers (N. N.), such numbers representing the acidity of the oil at the end of the test.

The oil used in this test was a highly refined oil, suitable for use in transformers, which had been prepared by treating a coastal distillate with 40 pounds of 98% sulfuric acid and 180 pounds of 103% oleum per barrel, followed by a clay percolation. This oil had a specific gravity of 0.871, a flash point of 310° F., and a Saybolt Universal viscosity of 69 seconds at 100° F. Such an oil forms mainly acidic products on oxidation, which are indicated by a high neutralization number.

TABLE I

| Agent Added | Per cent Used | N. N. Value |
|---|---|---|
| None | | 18 |
| Tri-3-thienyl trithiophosphite | 0.1 | 0.05 |
| Tri-3-thienyl trithiophosphate | 0.1 | 0.26 |
| Tri-3-thienyl tetrathiophosphate | 0.1 | 0.02 |

These same compounds were also blended with a motor oil to determine their effect on bearing corrosion. Motor oils, especially those refined by certain solvent-extraction methods, tend to oxidize when submitted to high temperatures and form products that are corrosive to metal bearings. This corrosive action may be quite severe with certain bearings, such as those having the corrosion susceptibility of cadmium-silver alloys; and it may cause their failure within a comparatively short time. The following test was used to determine the corrosive action of a motor oil on an automobile connecting-rod bearing.

The oil used consisted of Pennsylvania neutral and residuum stocks separately refined by means of solvents, and then blended to give an SAE 20 motor oil with a specific gravity of 0.872, a flash point of 435° F., and a Saybolt Universal viscosity of 318 seconds at 100° F. The oil was tested by adding about a 6-gram section of a bearing containing a cadmium-silver alloy surface and heating it to 175° C. for 22 hours while a stream of air was bubbled against the surface of the bearing at the rate of two liters per hour. The loss in weight of the bearing during this treatment is a measure of the amount of corrosion that has taken place. The results obtained from this test are given in Table II.

TABLE II

| Agent Added | Per cent Used | Mg. Loss in wt. |
|---|---|---|
| None | | 30 |
| Tri-3-thienyl trithiophosphite | 0.25 | 0 |
| Tri-3-thienyl trithiophosphate | 0.1 | 1 |
| Tri-3-thienyl tetrathiophosphate | 0.1 | 0 |

One of the above compounds was subjected to a Lauson oxidation stability test, the purpose of which is to determine oil deterioration as measured by increase in neutralization number and viscosity. The oil employed for this test consisted of Pennsylvania neutral and residuum stocks separately refined by means of solvents, and then blended to give an SAE 10 motor oil. A Lauson single cylinder, 4 cycle, liquid-cooled gasoline engine with jet lubrication was operated under the following conditions:

(1) Oil temperature=250–260° F.
(2) Jacket temperature=212° F.
(3) One-quarter throttle
(4) Air: fuel ratio=13:1
(5) No oil added during test The neutralization number (N. N.) and viscosity of the oil with and without the additive were reported for 12, 24 and 36 hours. These results are shown in Table III.

TABLE III

| | Neutralization Nos. | | | Kv. at 210° F. (centistokes) | | |
|---|---|---|---|---|---|---|
| | 12 hrs. | 24 hrs. | 36 hrs. | 12 hrs. | 24 hrs. | 36 hrs. |
| None | 1.4 | 3.7 | 8.6 | 5.91 | 6.54 | 8.35 |
| 1% Tri-3-thienyltrithiophosphite | 0.9 | 0.6 | 1.0 | 5.68 | 5.81 | 5.90 |

An additional Lauson oxidation stability test was run on a blend of tri-3-thienyl trithiophosphite and the results were as follows:

| Compound Added | Bearing Wt. Loss (g.) | N. N. | Per Cent Vis. Inc. |
|---|---|---|---|
| None | 0.500 | 4.7 | 38 |
| 0.5% tri-3-thienyltrithiophosphite | 0.003 | 2.9 | 15 |

From the foregoing test results, it can be observed that the reaction products contemplated herein are highly effective for stabilizing viscous petroleum oil fractions against the normal deteriorating effects of oxidation.

The acid esters, as well as the neutral esters, are useful as antioxidants, and in addition are particularly useful as extreme pressure lubrication improvers. The reaction products formed from 2-thiophenethiol are generally similar in their properties to those formed from 3-thiophenethiol, while those formed from thiophene polythiols are generally of higher molecular weight and viscous or resinous in nature. Nevertheless even these products exhibit antioxidant and extreme pressure lubricating characteristics when dissolved in lubricating compositions. Furthermore, they are in many cases useful per se, as synthetic lubricants and as resins.

This application is a division of application Serial No. 794,797, filed December 30, 1947.

What is claimed is:

1. As a new composition of matter, a reaction product obtained from the reaction involving from about one to about three mols of thiophenethiol with about one mol of a phosphorus halide, the reaction temperature being maintained from about 15° C. to about 150° C.

2. As a new composition of matter, a reaction product obtained from the reaction involving from about one to about three mols of 3-thiophenethiol with about one mol of a phosphorus halide, the reaction temperature being maintained from about 15° C. to about 150° C.

3. As a new composition of matter, a reaction product obtained from the reaction involving from about one to about three mols of thiophenethiol with about one mol of a phosphorus chloride, the reaction temperature being maintained from about 15° C. to about 150° C.

4. As a new composition of matter, a reaction product obtained from the reaction involving from about one to about three mols of 3-thiophenethiol with about one mol of phosphorus trichloride, the reaction temperature being maintained from about 15° C. to about 150° C.

5. As a new composition of matter, a reaction product obtained from the reaction involving from about one to about three mols of 3-thiophenethiol with about one mol of a phosphorus chloride, the reaction temperature being maintained from about 15° C. to about 150° C.

6. As a new composition of matter, a reaction product obtained from the reaction involving from about one to about three mols of 3-thiophenethiol with about one mol of phosphorus oxytrichloride, the reaction temperature being maintained from about 15° C. to about 150° C.

7. As a new composition of matter, a reaction product obtained from the reaction involving from about one to about three mols of 3-thiophenethiol with about one mol of phosphorus thiotrichloride, the reaction temperature being maintained from about 15° C. to about 150° C.

JOHN W. BROOKS.

REFERENCES CITED

The following references are of record in the file of this patent:

UNITED STATES PATENTS

| Number | Name | Date |
|---|---|---|
| 2,121,611 | Salzberg | June 21, 1938 |
| 2,160,293 | Shoemaker | May 30, 1939 |
| 2,188,943 | Evers | Feb. 6, 1940 |
| 2,293,445 | Nelson | Aug. 18, 1942 |
| 2,355,106 | Prutton | Aug. 8, 1944 |
| 2,382,905 | Pederson | Aug. 14, 1945 |
| 2,480,832 | Brooks | Sept. 6, 1949 |
| 2,502,390 | Reiff | Mar. 28, 1950 |

OTHER REFERENCES

Whitmore: "Organic Chemistry," page 893, Van Nostrand, N. Y., 1937.

Richter: "Organic Chemistry," pages 649–650, Wiley, N. Y., 1938.